United States Patent
Itsuki et al.

(10) Patent No.: US 10,298,000 B2
(45) Date of Patent: May 21, 2019

(54) DOOR HOLE SEAL FOR AUTOMOBILE

(71) Applicants: NISHIKAWA RUBBER CO., LTD., Hiroshima-shi, Hiroshima-ken (JP); HONDA MOTOR CO., LTD., Tokyo (JP)

(72) Inventors: Yasuhiro Itsuki, Hiroshima (JP); Naoya Sasaki, Hiroshima (JP); Satoshi Endo, Wako (JP); Hiromu Inoue, Wako (JP)

(73) Assignees: NISHIKAWA RUBBER CO., LTD., Hiroshima-Shi (JP); HONDA MOTOR CO., LTD., Tokyo (JP)

( * ) Notice: Subject to any disclaimer, the term of this patent is extended or adjusted under 35 U.S.C. 154(b) by 366 days.

(21) Appl. No.: 15/208,087

(22) Filed: Jul. 12, 2016

(65) Prior Publication Data

US 2017/0018916 A1    Jan. 19, 2017

(30) Foreign Application Priority Data

Jul. 16, 2015    (JP) .................................. 2015-142467
Apr. 21, 2016    (JP) .................................. 2016-085119

(51) Int. Cl.
*H02G 3/22* (2006.01)
*B60J 10/50* (2016.01)
(Continued)

(52) U.S. Cl.
CPC ................ *H02G 3/22* (2013.01); *B60J 10/50* (2016.02); *B60R 13/0243* (2013.01); *B60R 16/0215* (2013.01); *F16J 15/022* (2013.01)

(58) Field of Classification Search
CPC ................ F16J 15/022; B60R 16/0215; B60R 16/0222; H02G 3/22
See application file for complete search history.

(56) References Cited

U.S. PATENT DOCUMENTS 6,160,708 A * 12/2000 Loibl .................. B60R 16/0239
174/266
7,370,906 B2 * 5/2008 Isobe .................. B60R 16/0222
296/146.7
(Continued)

FOREIGN PATENT DOCUMENTS

DE    10-2007-001-039 A1    9/2007
GB    2-425-001 A    10/2006
(Continued)

OTHER PUBLICATIONS

Notification of Reasons for Refusal issued by the Japanese Patent Office in relation to Japanese Patent Application No. 2016-085119 dated Feb. 27, 2018 (3 pages) along with English translation (3 pages).

(Continued)

*Primary Examiner* — Nicholas L Foster
(74) *Attorney, Agent, or Firm* — Robert P. Michael, Esq.; Carter, DeLuca & Farrell LLP (57) ABSTRACT

A door hole seal is provided between an inner panel and a door trim of an automobile door. The door hole seal comprises a slit mechanism used to pull out a wire harness from an outer-cabin side to an inner-cabin side or from the inner-cabin side to the outer-cabin side. The slit mechanism comprises a first slit extending up and down with respect to the main sheet and a circular hole formed at a lower end of the first slit. The circular hole has a diameter that is identical to or slightly smaller than that of a wire harness, and is arranged to receive the wire harness.

3 Claims, 5 Drawing Sheets

(51) Int. Cl.
 *B60R 13/02* (2006.01)
 *B60R 16/02* (2006.01)
 *F16J 15/02* (2006.01)

(56) References Cited

U.S. PATENT DOCUMENTS

| | | | | |
|---|---|---|---|---|
| 8,206,809 | B2* | 6/2012 | Yash | F16J 15/062 |
| | | | | 16/2.1 |
| 8,556,332 | B2* | 10/2013 | Nakashima | B60R 13/0243 |
| | | | | 296/146.5 |
| 8,704,099 | B2* | 4/2014 | Agusa | B60R 16/0222 |
| | | | | 16/2.2 |
| 9,610,828 | B2* | 4/2017 | Suzuki | B60J 5/0418 |
| 2006/0005990 | A1* | 1/2006 | Fukuda | H01R 13/5213 |
| | | | | 174/74 A |
| 2007/0011949 | A1* | 1/2007 | Isobe | B60R 16/0222 |
| | | | | 49/475.1 |
| 2009/0117321 | A1* | 5/2009 | Yash | F16J 15/062 |
| | | | | 428/131 |
| 2012/0211262 | A1* | 8/2012 | Agusa | B60R 16/0222 |
| | | | | 174/152 G |
| 2016/0355076 | A1* | 12/2016 | Suzuki | B60J 5/0418 |

FOREIGN PATENT DOCUMENTS

| | | |
|---|---|---|
| JP | 62-156521 | 10/1987 |
| JP | H11-78526 A | 3/1999 |
| JP | 2004323002 A | 11/2004 |
| JP | 2005-319861 A | 11/2005 |
| JP | 2006282127 A | 10/2006 |
| JP | 2008-284966 A | 11/2008 |
| JP | 2008-284966 A | 11/2008 |
| JP | 2009-051459 A | 3/2009 |
| JP | 2009-051459 A | 3/2009 |
| JP | 2009113705 A | 5/2009 |

OTHER PUBLICATIONS

Extended European Search Report issued by the European Patent Office in relation to European Patent Application No. 16178543.1-1503 dated Dec. 21, 2016 (8 pages).

* cited by examiner

DOOR HOLE SEAL FOR AUTOMOBILE

CROSS REFERENCE TO RELATED APPLICATION

This application claims the benefit under 35 USC § 119 of JP Patent Application JP2015-142467 filed Jul. 16, 2015 and JP2016-085119 filed Apr. 21, 2016, the entire disclosures of which are incorporated herein by reference.

BACKGROUND OF THE INVENTION

The present invention relates to a door hole seal that is provided, for ensuring waterproof property, between an inner panel and a door trim of an automobile door. The door seal hole includes at a part thereof a slit mechanism that allows a wire harness of a window regulator, for example, to pass therethrough.

Figure 5:
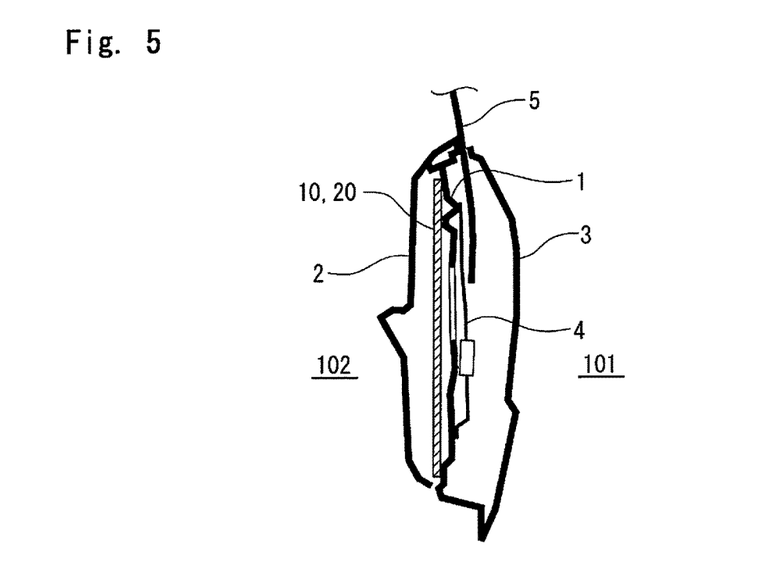
FIG. 5 is a schematic vertical sectional view of an automobile door provided with a door hole seal.
Figure 6:
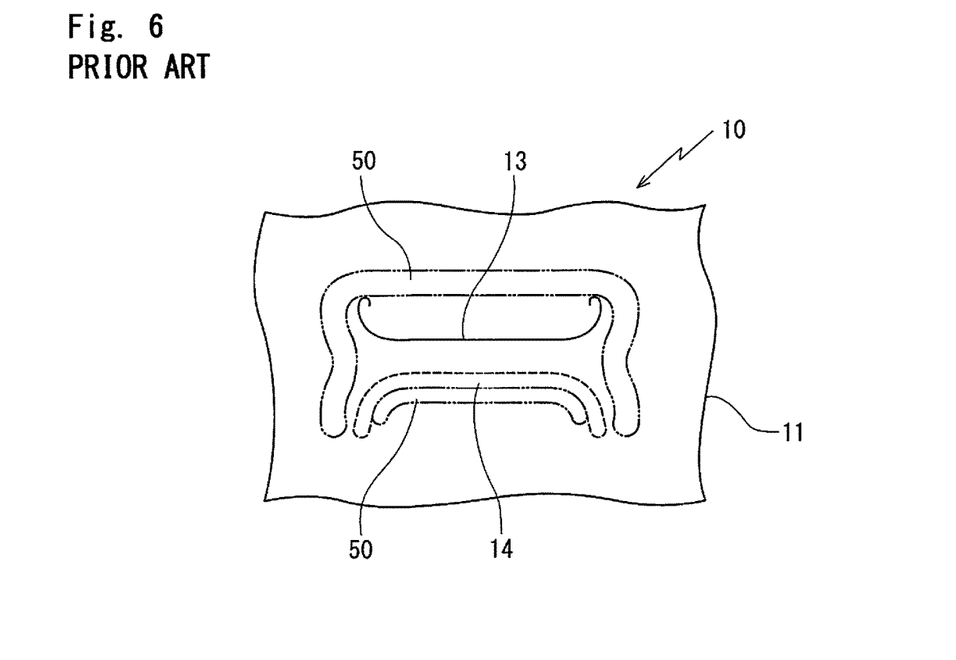
FIG. 6 is a side view illustrating an essential part of a door hole seal according to a prior art.
Figure 7:
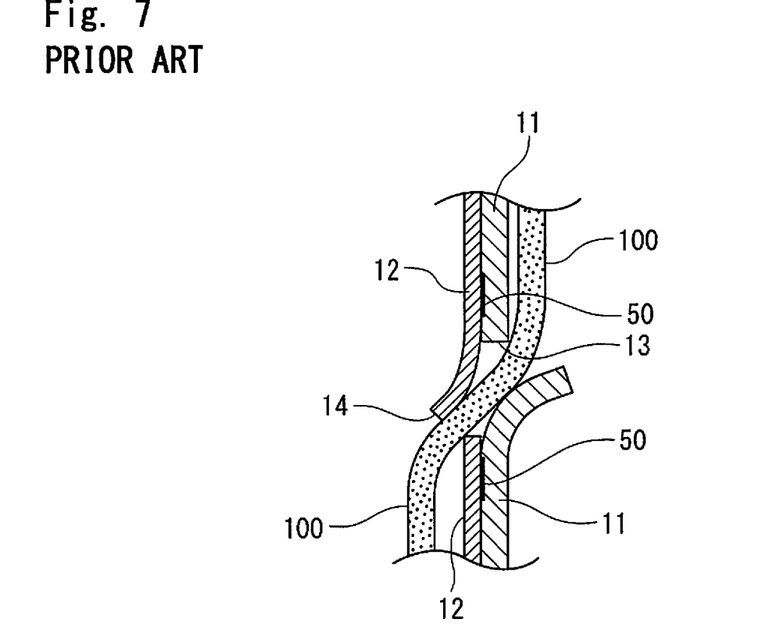
FIG. 7 is a vertical sectional view illustrating an essential part of the door hole seal according to the prior art.

As illustrated in FIG. 5, a door hole seal 10, in general, is provided between an inner panel 1 and a door trim 2 disposed at an inner-cabin side of the inner panel 1 in order to secure high waterproof property. As shown in FIGS. 6 and 7, the door hole seal includes a type that is provided with a slit 13 through which a wire harness of a window regulator, for example, is pulled out from an outer-cabin side 101 to an inner-cabin side 102. Such a configuration is disclosed in Japanese Unexamined Patent Application Publication No. 2009-51459 and Japanese Patent Publication No. 4858303, for example.

The door seal hole 10 includes a known type that is composed only of a single main sheet 11 provided with a slit 13, and a type illustrated in FIG. 7 that includes a main sheet 11 and a sub sheet 12 attached over the outer-cabin side of the main sheet 11, in which the sub sheet 12 is also provided with a slit 14. The sub sheet 12 is partially attached to the main sheet 11 by welding. Reference numeral 50 indicates the welded line along which the sub sheet 12 is attached to the main sheet 11.

Figure 8:
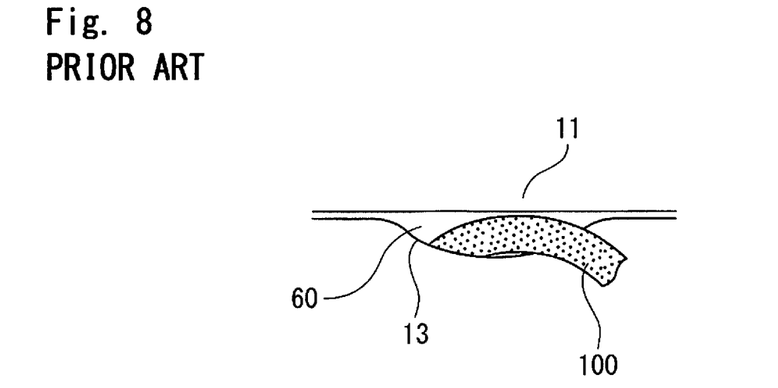
FIG. 8 is a side view illustrating the relation between a slit of the door hole seal and a wire harness pulled out from the slit, according the prior art.

The slit 13 provided to the conventional door hole seal 10 is formed so as to extend in a horizontal direction, and thus, as illustrated in FIG. 8, the wire harness 100 protruding and drooping from the slit 13 causes a generation of an open-mouth gap 60 in the main sheet 11. The generation of an open-mouth gap 60 adversely allows a leakage of sound therethrough, causing deterioration of the sound insulation property.

It should be noted that the abovementioned Japanese Unexamined Patent Application Publication No. 2009-51459 and Japanese Patent Publication No. 4858303 each disclose a slit for pulling out a wire harness 100 therethrough; however, they do not disclose any configuration that prevents a generation of an open-mouth gap.

It is therefore an object of the present invention to provide the door hole seal that is provided with a means to prevent the generation of an open-mouth gap, thereby preventing deterioration of the sound insulation property.

SUMMARY

In order to achieve the abovementioned object, according to one aspect of the invention, a door hole seal is provided between an inner panel (1) and a door trim (2) of an automobile door, the door hole seal comprising a slit mechanism (30) used to pull out a wire harness (100) from an outer-cabin side (101) to an inner-cabin side (102) or from the inner-cabin side (102) to the outer-cabin side (101), wherein the slit mechanism (30) comprises a first slit (23) extending up and down with respect to the main sheet (21, 41) and a circular hole (24, 34, 44) formed at a lower end of the first slit (23), the circular hole (24, 34, 44) having a diameter that is identical to or slightly smaller than the diameter of a wire harness (100), the circular hole (24, 34, 44) being arranged to receive the wire harness (100).

The aforementioned "up and down" indicates a direction in an automobile that rests horizontally.

In addition, according to an aspect of the present invention, the main sheet (21, 41) is made of a sound insulation sheet having the specific gravity of 0.05-0.4.

In addition, according to an aspect of the present invention, the circular hole (34) is configured to pass through the main sheet (21), the circular hole (34) having a diameter that radially expands in a reverse-tapered manner from an outer-cabin side (101) to an inner-cabin side (102) or from the inner-cabin side (102) to the outer-cabin side (101).

In addition, according to an aspect of the present invention, the main sheet (41) has a configuration of a double layered cross section, one layer (411) of which having the specific gravity smaller than that of the other layer (412) and having a water absorption rate greater than that of the other layer (412), or having the specific gravity smaller than that of the other layer (412) or having the water absorption rate greater than that of the other layer (412).

In addition, according to an aspect of the present invention, the circular hole (44) provided in the double layered main sheet (41) is configured to pass through the main sheet (41), the circular hole (44) having a diameter that radially expands in a reverse-tapered manner from the one layer (411) to the other layer (412), the one layer (411) having the smaller specific gravity and greater water absorption rate than the other layer (412), or having the smaller specific gravity or greater water absorption rate than the other layer (412).

Here, the one layer (411) having the smaller specific gravity and a greater water absorption rate than the other layer, or having the smaller specific gravity or a greater water absorption than the other layer includes one of the following three cases which are such that: the one layer (411) has the specific gravity that is smaller than that of the other layer (412); the one layer (411) has a water absorption rate that is greater than that of the other layer (412); and the one layer (411) has the specific gravity that is smaller than that of the other layer (412) and has a water absorption rate that is greater than that of the other layer (412).

In addition, according to an aspect of the present invention, a sub sheet (22) is attached to an outer-cabin side (101) of the main sheet (21, 41) in an overlaid manner, the sub sheet (22) being provided with a second slit (25) below the circular hole (24, 34, 44), the second slit (25) extending in a substantially horizontal direction.

Symbols in parentheses show constituents or items corresponding to the drawings.

According to the present invention, the door hole seal is disposed between the inner panel and the door trim of an automobile door, and the door hole seal is provided with the slit mechanism. The slit mechanism is used to pull out a wire harness from the outer-cabin side to the inner-cabin side or from the inner cabin side to the outer cabin side. The slit mechanism includes the first slit extending up and down with respect to the main sheet and the circular hole formed at the lower end of the first slit. The diameter of the circular hole is identical to or slightly smaller than that of the wire harness. The circular hole receives the wire harness. The slit mechanism of the door hole seal provided with such a configuration restrains the drooping of the wire harness and allows the wire harness to tightly fit the circular hole with a stable posture.

In addition, the circular hole provides no gaps or a little gap between the circular hole and the wire harness, thereby preventing a generation of an open-mouth gap in the slit, as well as preventing a deterioration of the sound insulation property and an intrusion of water. Furthermore, since the slit is provided with the circular hole at the lower end thereof, the vertical vibration of the wire harness caused by the vibration of an automobile will not cause a load concentration at the lower end of the slit. This prevents a rip or tear of the slit.

Moreover, the main sheet made of the soft or flexible noise insulation sheet having the specific gravity of 0.05-0.4 surrounds or wraps the wire harness from outside, after the wire harness is received by the circular hole. This further reduces the amount or the degree of the open-mouth gap.

Furthermore, according to the present invention, the main sheet is provided with the circular hole that passes through the main sheet and has a diameter that radially expands in a reverse-tapered manner from the outer-cabin side to the inner cabin side or from the inner cabin side to the outer cabin side. Thus, when a wire harness is inserted from the side of a larger diameter, the wire harness is readily inserted, while the side of a smaller diameter allows that part of the main sheet to further tightly fit the wire harness, thereby preventing a generation of a gap between the main sheet and the wire harness.

Furthermore, the main sheet of the double layered structure, in which one layer has the smaller specific gravity and a greater water absorption rate than the other layer, or has the smaller specific gravity or a greater water absorption rate than the other layer, can intentionally include a soft or flexible layer. Such a structure makes the main sheet as a whole softer or more flexible than a main sheet of a single layered structure. Thus, such double layered structure would not reduce a tight fit performance or close adherence of the main sheet with respect to the wire harness, under the variations in manufacturing and handling of main sheets. In addition, with the double layered main sheet provided with the circular hole that is formed in a reverse-tapered manner so as to provide a smaller diameter to the flexible layer and a larger diameter to the other layer, the flexible layer is allowed to further tightly fit the wire harness.

Moreover, in the present invention, the sub sheet is attached to the main sheet on the outer-cabin side of the main sheet in an overlaid manner, in which the sub sheet is provided with the second slit that extends substantially horizontally below the position of the circular hole. Such a double-sheet configuration further improves the sound insulation effect and prevents an intrusion of water.

DETAILED DESCRIPTION

Figure 1:
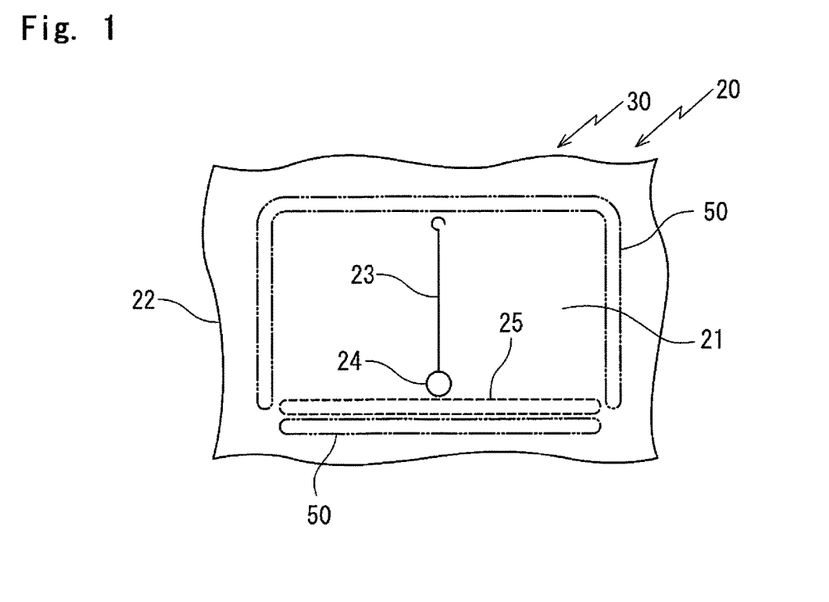
FIG. 1 is an side view illustrating an essential part of a door hole seal according to an embodiment of the present invention.
Figure 2:
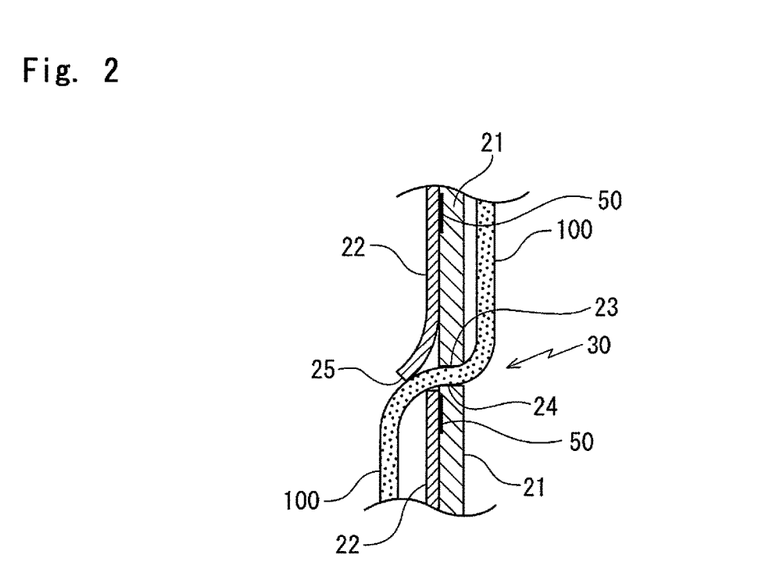
FIG. 2 is a vertical sectional view illustrating an essential part of the door hole seal according to the present invention.
Figure 3:
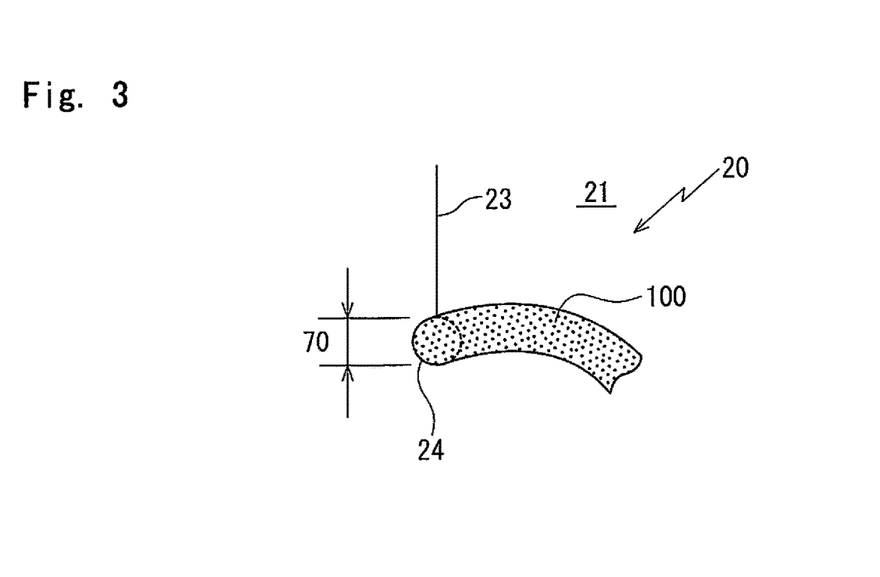
FIG. 3 is a side view illustrating the relation between a slit of the door hole seal and a wire harness pulled out from the slit, according an embodiment of the present invention.

Referring to FIGS. 1 to 3, a door hole seal 20 according to an embodiment of the present invention will be described.

The door hole seal 20 is disposed between an inner panel 1 and a door trim 2 of an automobile door. The door hole seal 20 includes at an upper part thereof a slit mechanism 30 that is used in pulling out a wire harness 100 from an outer-cabin side to an inner cabin-side, the wire harness 100 being used to raise and lower a door glass 5.

The slit mechanism 30 includes a first slit 23 formed in a main sheet 21, a circular hole 24 formed in the first slit 23, and a second slit 25 formed in a sub sheet 22 that is overlaid on the outer-cabin side of the main sheet 21.

The main sheet 21 is composed of a sound insulating sheet made of a soft material and having the specific gravity of 0.05-0.4. The soft material in this embodiment is an ethylene-propylene-diene rubber (EPDM) foam material (which may also be called a "NI sheet").

The first slit 23 extends up and down with respect to the main sheet 21, or more specifically, the first slit 23 linearly extends in a substantially vertical direction in the main sheet 21, and is provided with the circular hole 24 at the lower end thereof. The first slit 23 has a cut of a single straight line formed by a up or down movement of a cutter (not illustrated), and thus has a width that is not wide. The "up and down" in this case indicates a direction in a automobile staying in a horizontal position.

The circular hole 24 has a diameter 70 that is slightly smaller than that of the wire harness 100, which arrangement enables a stable installation of the wire harness 100 in the circular hole 24 and prevents displacement of the wire harness 100 in the vertical and horizontal directions. The diameter 70 of the circular hole 24 may be the same as that of the wire harness 100, but the diameter 70 of the circular hole 24 slightly smaller than that of the wire harness 100 allows the main sheet 21, which is made of a soft material, to surround the outer circumference of the wire harness 100 in a tight fit manner. Thus, the latter arrangement decreases the amount of an open-mouth gap in the first slit 23 and thus is preferable.

The sub seat 22 is made of a polyethylene (PE) film and is partially attached to the main sheet 21 by an adhesive or welding. In the embodiment illustrated in FIG. 1, the sub seat 22 entirely covers the first slit 23 inclusive of the circular hole 24, and is welded so as to wholly surround or cover the first slit 23 inclusive of the circular hole 24. In the figure, the welded line is shown with the reference numeral 50 and has a rectangular shape.

The second slit 25 extends substantially in parallel with the sub seat 22, and is formed below the circular hole 24 and above the welded line 50. The second slit 25 in this embodiment has a width of some dimension in a vertical direction.

Alternatively, the second slit 25 may be formed, using a cutter (not illustrated), of a cut of a single straight line in a horizontal direction.

The slit mechanism 30 may be formed of the main sheet 21, the first slit 23 and the circular hole 24 both provided on the main sheet 21. Instead, the slit mechanism 30 formed of the main sheet 21 with an addition of the sub seat 22 that is overlaid on the main sheet 21 and is provided with the second slit 25, is such that the sub sheet 22 serves as a supporting material of the main sheet 21 that is soft or flexible. The slit mechanism 30 having such a configuration prevents an excessive drooping of the main sheet 21 caused by the weight of the wire harness 100, and improves the sound insulation effect and prevents a water intrusion by a double sheet structure of the main sheet 21 and the sub seat 22.

The second slit 25 restricts the vertical movement of the wire harness 100, while the circular hole 24 of the main sheet 21 restricts the horizontal movement of the wire harness 100. Thus, the wire harness 100, once it is placed in position, is hardly displaced.

The first slit 23 linearly extends in a substantially vertical direction with respect to the main sheet, and thus the wire harness 100, once installed in the circular hole 24, is also restricted to move, by its weight, along the first slit 23.

Besides the polyethylene, the sub sheet 22 may be made of other kinds of thermoplastic resin such as polypropylene (PP).

The vertical direction and the horizontal direction in the embodiment refer to the directions viewed on the figures, and at the same time, they refer to the directions of the door hole seal 20 that has been mounted to an automobile. In addition, the wording of the "substantially vertical" includes an angle ranging about 40 degrees in both sides from the exact vertical line on the main sheet 21 installed on an automobile resting in a horizontal posture. The wording of the "vertical" includes an angle ranging about 10 degrees in both sides from the exact vertical line on the main sheet 21 installed on an automobile resting in a horizontal posture. The slit mechanism 30 employing the abovementioned angles that range in some degrees from the genuine vertical is determined to fulfill its functionality. It would be most preferable that the first slit 23 is positioned vertically and the second slit 25 is positioned horizontally. This is because of the function of the sub sheet 22 to be described below. That is, the second slit 25 excessively sloped would deteriorate the waterproof property compared to a second slit horizontally provided, and the first slit 23 is considered to be preferably normal to the second slit 25 in order to prevent displacement of the harness wire 100.

In the embodiment, both the main sheet 21 and the sub sheet 22 are made of a waterproof material, thereby preventing an intrusion of water into the inner-cabin side through the sub sheet 22 and the main sheet 21.

Furthermore, in the embodiment, the first slit 23 and the second slit 25 each are provided at each end part thereof with a slit-termination part of a round hole shape (circular shape) so as to prevent cut and tear in the slits 23, 25.

According to the door hole seal 20 having the abovementioned configuration, the slit mechanism 30 for pulling out the wire harness 100 from the outer-cabin side to the inner-cabin side includes the first slit 23 extending in a substantially vertical direction with respect to the main sheet 21, and the circular hole 24 formed at the lower end of the first slit 22 and having a diameter slightly smaller than that of the wire harness 100 in order to receive the wire harness 100. This configuration prevents an excessive drooping of the wire harness 100, and the wire harness 100 is stably installed in the circular hole 24 in a tight fit manner.

Because of the abovementioned configuration, no gaps or only a little gap is formed between the circular hole 24 and the wire harness 100, which prevents a generation of an open-mouth gap in the slit 23, thereby restraining a deterioration of the sound insulation property and an intrusion of water.

Figure 4:
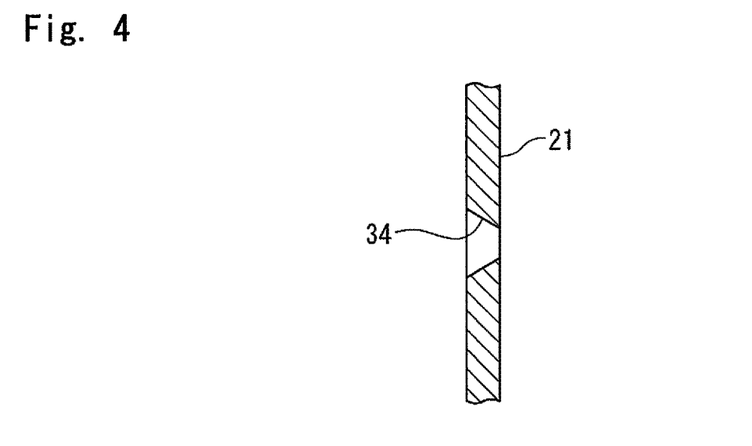
FIG. 4 is a side view illustrating an essential part of another door hole seal according to an embodiment of the present invention.

In this embodiment, the circular hole 24 passing through the main sheet 21 has a diameter that is invariably continuous from the outer-cabin side 101 to the inner-cabin side 102. Alternatively, as illustrated in FIG. 4, the circular hole 34 passing through the main sheet 21 may be provided with a diameter that radially expands in a reverse-tapered manner from one side of the main sheet 21 to the other side thereof.

With this configuration, when the circular hole 34 is disposed so as to locate the part of a smaller diameter at the outer-cabin side 101, a thus prepared thin tip end of the main sheet 21 makes, with a combination of its material flexibility, an improved tight fit with the wire harness 100. This can further prevent a generation of a gap between the circular hole 34 and the wire harness 100. In addition, the outer-cabin side 101 constructs a no-gap seal, so that an intrusion of water or the like can be surely prohibited at a location well ahead an entrance.

Contrary, when the circular hole 34 is disposed so as to locate the part of a larger diameter at the outer-cabin side 101, the insertion of the wire harness 100 from the outer-cabin side 101 is facilitated in an insertion operation of the wire harness 100. In this arrangement, at the part of a smaller dimension, which is located at the inner-cabin side 102, the main sheet 21 makes an improved tight fit with the wire harness 100, thereby preventing a generation of a gap.

Figure 9:
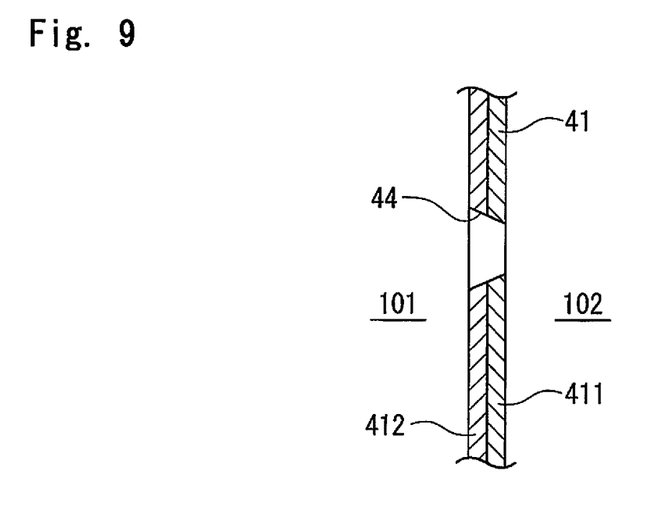
FIG. 9 is a side view illustrating an essential part of another door hole seal according to an embodiment of the present invention.

As illustrated in FIG. 9, the main sheet 41 can be made of a foamed body having a double layered cross section. One layer in this configuration has the specific gravity that is smaller than that of the other layer, or the one layer has a water absorption rate that is greater than that of the other layer. As described above, the double layered main sheet 41 provided with the circular hole 44, has at least one layer that is intentionally provided more flexible than the other layer. Thus, the intentionally provided flexible layer would not reduce the flexibility of the main sheet 41 as a whole, compared to a main sheet made of a uniform material, even if any variation occurs in the main sheet 41 during a manufacturing process. Consequently, the circular hole 44 of the main sheet 41 retains the flexibility and thus restrains the variation of the tight fit performance or close adherence, even if a wire harness 110 of a varied thickness is applied and an installation operation of the wire harness 110 is inconsistent. Accordingly, the double layered structure of the main sheet 41 is effective in the present invention.

In the aforementioned double layered main sheet 41 provided with the circular hole 44 having a diameter that expands in the cross section, it is preferable that one layer 411 having the smaller specific gravity and the greater water absorption rate than the other layer 412, or having the smaller specific gravity than the other layer 412, or having the greater water absorption rate than the other layer 412 is provided with a diameter that is smaller than that of the other layer. The one layer 411 of the smaller specific gravity and the greater water absorption rate, or of the smaller specific gravity, or the greater water absorption rate has better flexibility than the other layer 412. Thus, the one layer 411 with a diameter smaller than that of the wire harness 100 allows an insertion of various wire harnesses 100 therethrough and absorbs the variation of the thicknesses of the wire harnesses 100, thereby providing an improved tight fit with respect to the various wire harnesses 100. In general, the one layer 411 having the smaller specific gravity and the greater water absorption rate than the other layer, or having the smaller specific gravity than the other layer or having the greater water absorption rate than the other layer is disposed at an inner-cabin side, so that an outer-cabin side properly retains the waterproof property.

The one layer 411 having the smaller specific gravity and the greater water absorption rate than the other layer, or having the smaller specific gravity than the other layer, or having the greater water absorption rate that the other layer in this embodiment includes one of the three cases which are such that: the one layer 411 has the specific gravity that is smaller than that of the other layer 412; the one layer 411 has the water absorption rate that is greater than that of the other layer 412; and the one layer 411 has the specific gravity that is smaller than that of the other layer 412 and has the water absorption rate that is greater than that of the other layer 412.

This embodiment discloses the door hole seal 20 including the slit mechanism 30 used to pull out the wire harness 100 from the outer-cabin side 101 to the inner-cabin side 102. Alternatively, the slit mechanism 30 may be employed in such an arrangement that the wire harness 100 is pulled out from the inner-cabin side 102 to the outer-cabin side 101. In addition, this embodiment discloses the wire harness 100 for the window regulator that vertically moves a door glass 5. There are various types of wire harnesses used, each of which is employed for a door lock, a door mirror and a door outer handle. These types of harnesses can also be employed in the present invention.

We claim:

1. A door hole seal provided between an inner panel and a door trim of an automobile door, the door hole seal comprising:

a slit mechanism used to pull out a wire harness from an outer-cabin side to an inner-cabin side or from the inner-cabin side to the outer-cabin side, wherein the slit mechanism comprises a first slit extending up and down with respect to a main sheet and a circular hole formed at a lower end of the first slit, the circular hole having a diameter that is identical to or slightly smaller than the diameter of a wire harness, the circular hole being arranged to receive the wire harness, wherein the circular hole passes through the main sheet and has a diameter that increases in reverse-tapered manner from the outer-cabin side to the inner-cabin side or from the inner-cabin side to the outer-cabin side, and wherein the main sheet has a configuration of a double layered cross section, one layer of which having the specific gravity smaller than that of the other layer and having a water absorption rate greater than that of the other layer, or having the specific gravity smaller than that of the other layer, or having the water absorption rate greater than that of the other layer.

2. The door hole seal as claimed in claim 1, wherein the main sheet is made of a sound insulation sheet having specific gravity of 0.05-0.4.

3. The door hole seal as claimed in claim 1, wherein the circular hole provided in the double layered main sheet passes through the main sheet, the circular hole having the diameter that radially increases in the reverse-tapered manner from the one layer to the other layer, the one layer having the smaller specific gravity and the greater water absorption rate than the other layer, or having the smaller specific gravity than the other layer, or having the greater water absorption rate than the other layer.

\* \* \* \* \*